United States Patent Office 3,728,270
Patented Apr. 17, 1973

3,728,270
CHEMILUMINESCENT FORMULATION CONTAINING INORGANIC SALT SOLUTION
Everett M. Bens and Carl H. Morley, China Lake, Calif., assignors to the United States of America as represented by the Secretary of the Navy
No Drawing. Filed July 30, 1965, Ser. No. 476,789
Int. Cl. C09k 3/00
U.S. Cl. 252—188.3      4 Claims

ABSTRACT OF THE DISCLOSURE

A method for increasing the efficiency in chemiluminescence of the composition, tetrakis(dimethylamino)ethylene (TMAE), for use in nocturnal markers where fire retardant materials should be utilized which comprises adding an inorganic salt of the alkali or alkaline earth metals to the composition TMAE at room temperature in the absence of air.

---

The invention described herein may be manufactured and used by or for the Government of the United States of America for governmental purposes without the payment of any royalties thereon or therefor.

The invention relates to a method of and formulation for improved chemiluminescence; more particularly, to new formulations containing tetrakis(dimethylamino)ethylene.

Tetrakis(dimethylamino)ethylene is an interesting compound which was first reported by Pruett et al., J. Am. Chem. Soc., 73, 3646 (1950). It is oxyluminescent, and stable for indefinite periods of time when enclosed in containers that are impermeable to oxygen or air. This compound has been used alone, or with thickeners to improve practical applications. Various materials have been added, such as alcohols and organic acids, which increase the intensity of light, but in all cases the total light output per unit chemilumescent material has been reduced. The present invention provides increased light output per unit of chemiluminescent material.

It is therefore an object of the present invention to provide a method for improving the chemiluminescence of tetrakis(dimethylamino)ethylene for use as nocturnal markers or signals.

Another object is to provide an improved chemiluminescent formulation for use where fire retardant materials must be utilized.

Still another object is to provide a chemiluminescent formulation for use where both the initial light intensity and the length of the duration need to be controlled.

Other objects, features, and many of the attendant advantages of this invention will become readily appreciated as the same become better understood by reference to the following detailed description.

The present invention is directed to the method of and formulation for increasing the efifficiency in chemiluminescence of tetrakis(dimethylamino)ethylene. It comprises the addition of an inorganic salt, especially of the alkali metals or alkaline earth metals, or solution thereof, to tetrakis(dimethylamino)ethylene at room temperature and in the absence of air.

The following examples will better describe the invention but should not be considered as limiting it.

EXAMPLE I

When a sample of forty microliters of tetrakis(dimethylamino)ethylene was added to approximately one gram of dry sodium perchlorate and exposed to the atmosphere, the total light emitted per unit of chemiluminescent material, as measured by a light measuring device, was greater by a factor of three than a similar sample of tetrakis(dimethylamino)ethylene without a salt being present. The product is dry and therefore increases utilization of this formulation.

Other dry inorganic salts were treated with tetrakis(dimethylamino)ethylene by the same procedure set out in Example I with varying degrees of success. The following table gives the results:

TABLE I

[40 microliters of tetrakis(dimethylamino)ethylene and one gram of dry or hydrated salt]

| Sample | Total emission, relative | Peak intensity, ft.-lamberts | Time to extinction, min. |
|---|---|---|---|
| Control (without salt) | 13,145 | 0.49 | 14.0 |
| NaCl | 10,496 | 0.52 | 24.0 |
| $Na_2SO_4$ | 11,537 | 0.90 | 11.4 |
| $Na_2CO_3$ | 9,614 | 0.81 | 11.0 |
| $NaClO_4$ | 43,698 | 0.21 | 47.4 |
| $NaNO_3$ | 9,059 | 0.50 | 25.0 |
| $MgCl_2$ | 20,736 | 0.40 | 35.0 |
| $CaCl_2$ | 27,634 | 0.50 | 38.0 |
| $Na_2B_4O_7 \cdot 10H_2O$ | 13,682 | 1.55 | 7.0 |
| $Na_2PO_4 \cdot 12H_2O$ | 9,693 | 0.96 | 4.2 |
| $K_2B_4O_7 \cdot 4H_2O$ | 10,053 | 0.44 | 17.0 |
| $K_3PO_4 \cdot H_2O$ | 9,352 | 0.45 | 11.0 |
| $Ca_3(PO_4)_2$ | 3,922 | 0.89 | 4.5 |
| $Mg_3(PO_4)_2 \cdot 4H_2O$ | 3,800 | 2.5 | 4.0 |
| $NaSiO_3$ | 26,201 | 0.62 | 24.0 |
| $CsCO_3$ | 11,353 | 1.24 | 11.0 |
| NaI | 28,660 | 0.21 | 62.0 |
| KI | 20,500 | 0.24 | 60.0 |
| $NH_4Cl$ | 10,711 | 0.42 | 11.0 |
| $NH_4NO_3$ | 10,808 | 0.32 | 19.0 |
| $Ba(OH)_2$ | 10,768 | 1.25 | 5.5 |
| $Na_4P_2O_7$ | 8,301 | 0.52 | 10.0 |
| $K_2Cr_2O_7$ | 2,468 | .07 | 12.5 |

EXAMPLE II

Forty microliters of tetrakis(dimethylamino)ethylene were added to 10 milliliters of one-normal (1 N) solution of sodium chloride under inert atmospheric conditions at room temperature. Upon exposure to the atmosphere, the total light emission was almost a threefold increase over the control, consisting of tetrakis(dimethylamino)ethylene and water.

The tetrakis(dimethylamino)ethylene was added to other inorganic one-normal salt solutions with the following excellent results shown in Table II below:

TABLE II

[40 microliters of tetrakis(dimethylamino)ethylene added to 10 milliliters of 1N inorganic salt solution]

| Sample | Peak intensity, ft.-lamberts | Total emission, relative | Time to extinction, min. |
|---|---|---|---|
| Control ($H_2O$ only) | 0.62 | 19,700 | 14.2 |
| NaCl | 0.96 | 32,500 | 18.0 |
| LiCl | 0.80 | 27,500 | 15.0 |
| KCl | 0.90 | 23,900 | 14.9 |
| $BaCl_2$ | 1.01 | 30,100 | 16.3 |
| $CaCl_2$ | 1.02 | 16,700 | 15.0 |
| $MgCl_2$ | 0.88 | 13,500 | 13.7 |
| $NH_4Cl$ | 0.54 | 22,500 | 17.0 |
| $NH_4I$ | 0.43 | 17,000 | 27.5 |
| NaI | 0.32 | 29,200 | 52.0 |
| KI | 0.67 | 63,800 | 35.0 |
| $BaI_2$ | 0.24 | 24,400 | 27.5 |
| $NH_4NO_3$ | 0.54 | 8,500 | 10.0 |
| $NaHCO_3$ | 0.51 | 15,600 | 13.1 |
| $KHCO_3$ | 0.53 | 21,400 | 14.3 |
| $Na_2CO_3$ | 0.70 | 22,800 | 16.9 |
| $K_2CO_3$ | 0.61 | 27,900 | 27.2 |
| $CaCO_3$ | 0.76 | 45,000 | 22.3 |
| $Na_2SO_4$ | 0.87 | 29,900 | 14.9 |
| $MgSO_4$ | 0.87 | 24,100 | 21.0 |
| $LiClO_4$ | 0.97 | 28,900 | 14.2 |
| $NaClO_4$ | 1.03 | 32,400 | 16.6 |
| $Ba(ClO_4)_2$ | 0.90 | 23,900 | 14.7 |
| $Na_2Cr_2O_7$ | 0.21 | 12,300 | 19.3 |
| $K_3PO_4$ | 0.47 | 27,000 | 53.0 |

EXAMPLE III

Following the procedure described in Example II, forty microliters of tetrakis(dimethylamino)ethylene were added to 10 milliliters of a saturated solution of sodium silicate ($Na_2SiO_3$) with greatly increased oxyluminescence resulting over an extended period of time (about 17 minutes).

TABLE III

[40 microliters tetrakis(dimethylamino)ethylene added to 10 ml. saturated inorganic salt solution]

| Sample | Peak intensity, ft.-lamberts | Total emission, relative | Time to extinction, min. |
|---|---|---|---|
| Control ($H_2O$ only) | 0.62 | 19,700 | 14.2 |
| $Na_2SiO_3$ | 0.74 | 30,800 | 32.0 |
| $Ba(OH)_2$ | 1.02 | 41,700 | 35.0 |
| CsOH | 0.54 | 16,000 | 14.0 |
| $Na_3PO_4$ | 0.58 | 15,700 | 17.0 |
| $Na_3PO \cdot 12 H_2O$ | 0.74 | 46,600 | 57.0 |
| $Ca_3(PO_4)_2$ | 0.81 | 14,200 | 12.5 |
| $Na_4P_2O_7$ | 0.59 | 26,800 | 16.1 |
| $Na_2B_4O_7 \cdot 10 H_2O$ | 0.90 | 37,800 | 27.0 |
| $K_2B_4O_7 \cdot 4 H_2O$ | 0.61 | 19,000 | 27.0 |
| $K_2Cr_2O_7$ | 0.21 | 8,600 | 20.0 |

The amount of tetrakis(dimethylamino)ethylene to salt solution may be of about equal parts with varying light emission results.

Many of the inorganic salts used herein are fire retardants, such as sodium phosphate, and serve to prevent ignition of organic materials on which these formulations may be used.

Obviously many modifications and variations of the present invention are possible in the light of the above teachings. It is therefore to be understood that within the scope of the appended claims the invention may be practiced otherwise than as specifically described.

What is claimed is:

1. An improved chemiluminescent formulation comprising a mixture of tetrakis(dimethylamino)ethylene and an inorganic salt solution selected from the group consisting of a chloride of sodium, lithium, potassium, barium or ammonium, an iodide of sodium, potassium or barium, a carbonate of potassium or calcium, a chlorate of lithium, sodium or barium, sodium silicate, sodium borate, trisodium phosphate, and tetrasodium pyrophosphate.

2. An improved chemiluminescent formulation comprising a mixture of tetrakis(dimethylamino)ethylene and a dry inorganic salt selected from the group consisting of sodium chlorate, magnesium chloride, sodium silicate, sodium iodide and potassium iodide.

3. A method for extending chemiluminescence comprising:
   adding about 40 milliliters of tetrakis(dimethylamino)ethylene to one gram of dry inorganic salt selected from the group consisting of sodium chlorate, magnesium chloride, sodium silicate, sodium iodide and potassium iodide.

4. A method of extending chemiluminescence comprising:
   adding about 40 milliliters of tetrakis(dimethylamino)ethylene to about 10 milliliters of a solution of an inorganic salt selected from the group consisting of a chloride of sodium, lithium, potassium, barium or ammonium, an iodide of sodium, potassium or barium, a carbonate of potassium or calcium, a chlorate of lithium, sodium or barium, sodium silicate, sodium borate, trisodium phosphate and tetrasodium pyrophosphate.

References Cited

UNITED STATES PATENTS 3,311,564  3/1967  Cline _____ 252—188.3

STEPHEN J. LECHERT, JR., Primary Examiner

U.S. Cl. X.R.

252—301.3 R